Jan. 5, 1937.    C. C. HARBRIDGE    2,066,684
LOCK NUT
Filed April 6, 1933
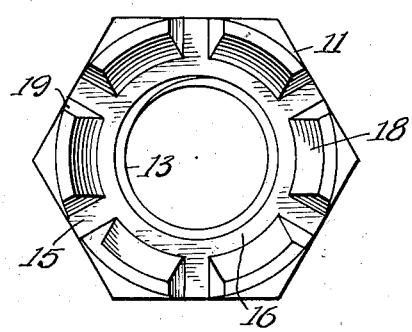
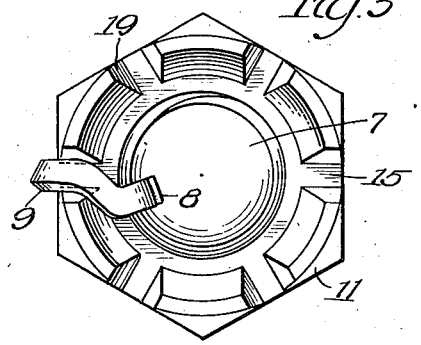
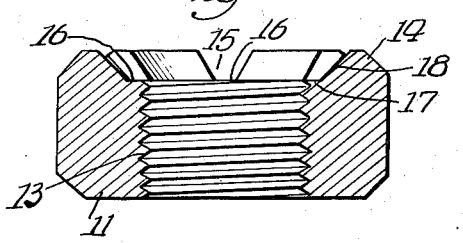
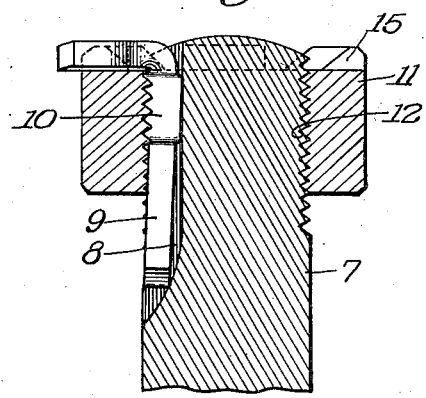
Inventor:
Chester C. Harbridge
By Fred Gerlach
his Atty.

Patented Jan. 5, 1937

2,066,684

UNITED STATES PATENT OFFICE 2,066,684

LOCK NUT

Chester C. Harbridge, Detroit, Mich., assignor to Pin Lock Corporation, Detroit, Mich., a corporation of Michigan Application April 6, 1933, Serial No. 664,709

7 Claims. (Cl. 151—5)

The invention relates generally to nuts for bolts. More particularly the invention relates to that type of nut which is adapted to be locked to a bolt by means of a transversely bendable, longitudinally extending, locking pin on the bolt.

The primary object of the invention is to provide a nut of this type which has an annular series of radial notches on the outer end thereof for receiving the locking pin of the bolt with which it is used and also has novel means for facilitating bending of the pin into one of the notches when the pin and notch are not in exact registry.

Another object of the invention is to provide a nut of the last mentioned character in which the pin receiving notches are flared axially of the nut so as to permit of ready entry of the pin during bending of the pin into locked relation with the nut.

A further object of the invention is to provide a nut which is generally of new and improved construction may be manufactured at a low and reasonable cost and is efficient in operation.

Other objects of the invention and the various advantages and characteristics of the present nut construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views: Fig 1 is a plan view of a nut embodying the invention. Fig. 2 is a longitudinal section of the nut. Fig. 3 is a plan view showing the nut mounted on a pin-equipped bolt and the pin bent into one of the locking notches of the nut. Fig. 4 is a longitudinal section of the bolt and nut.

The nut which forms the subject of the invention is designed for use with a bolt 7 having a longitudinal groove 8 for a locking pin 9 with an enlarged central portion 10. The latter is adapted to be grooved by the thread of the nut as the latter is applied to the bolt. The nut for the bolt is designated in the drawing by the numeral 11 and is formed of polygonal stock. It embodies the usual internal thread 13 and to permit it to be screwed or turned onto the thread 12 on the shank of the bolt. The outer end of the nut 11 is provided with a series of radial notches 15. The latter correspond in number to the sides of the nut and are arranged so that they are centrally disposed with, and extend at right angles to, the nut sides. In addition to being provided with the notches 15, the outer end of the nut is counter-bored and chamfered to form an annular groove 16 around the hole or bore in the nut. This groove has a straight or flat lower face 17 and an upwardly and outwardly inclined side face 18. The latter, as shown particularly in Fig. 2 of the drawing, is inclined upwardly and outwardly at approximately an angle of 45°.

When the nut has been applied to the bolt and the expanded or enlarged central portion 10 of the locking pin 9 has been cross grooved by the thread in the nut, the outer end of the pin is bent into one of the radial notches 15 in the nut to lock the nut against rotation. The construction of this pin is similar to that exhibited in Letters Patent of the United States No. 1,918,263 granted to me July 18, 1933.

In this type of bolt it is desirable to avoid the necessity of turning one of the notches 15 into exact radial alinement or registry with the pin. By forming the groove 16 around the inner periphery of the nut with its straight lower face 17 and inclined side face 18, an annular space or clearance is left across which the end of the pin 9 can be bent obliquely from its normal position into an adjacent but non-alined notch 15 as illustrated in Fig. 3. The sides of the notches 15 are flared longitudinally of the nut as at 19 further to facilitate the entry of the end of the pin 9 into the notches, the inclined sides serving to deflect the pin into the selected notch as it is being bent or hammered down into place.

The nut 11 is characterized by the fact that it is provided with a series of locking notches for a locking pin and is also provided with an annular space which permits of oblique bending of the end of the pin into a notch. In addition, the nut is characterized by the fact that the notches are flared outwardly to deflect or facilitate the entry of the pin into locking position.

The invention is not to be understood as restricted to the details set forth since these may be modified within the scope of the appended claims without departing from the spirit and scope of the invention.

Having thus described the invention, what I claim as new and desire to secure by Letters Patent, is:

1. As a new article of manufacture a lock nut adapted for use with a bolt having a threaded shank with a longitudinal groove in outer end thereof for a transversely bendable locking pin, said nut having an internally threaded bore extending longitudinally therethrough for receiving the threaded end of the bolt and having in the outer end thereof comparatively wide, radially extending, pin-receiving notches each of which has sides which flare outwardly longitudinally of the pin to facilitate bending of the pin into it when it is adjacent to, but not directly aligned with, the groove.

2. As a new article of manufacture, a lock nut designed for use with a bolt embodying a longitudinal groove in the outer end of the threaded shank thereof for a transversely bendable locking pin, and having an internally threaded, longitudinally extending hole for receiving the shank of the bolt and also having an annular series of radially extending, pin receiving notches in the outer end thereof with outwardly flared sides, said nut being adapted to be turned onto the outer end of the shank of the bolt into a clamping position and embodying an annular space in the notched part and around the outer end of the hole, whereby when the nut is rotated into a clamping position wherein the notch nearest the groove in the shank of the bolt is not directly aligned with said groove the outer end of the pin may be deflected partially around the bolt and then bent outwardly transversely of the bolt between the outwardly flared sides of said nearest notch.

3. As a new article of manufacture, a lock nut designed for use with a bolt embodying a longitudinal groove in the outer end of the threaded shank thereof for a transversely bendable locking pin, and having an internally threaded, longitudinally extending hole for receiving the shank of the bolt and also having an annular series of radially extending, pin receiving notches in the outer end thereof with outwardly flared sides, said nut being adapted to be turned onto the outer end of the shank of the bolt into a clamping position and embodying in the notched part thereof a chamfer leading to the outer end of the internally threaded hole and forming an outwardly flared annular space whereby when the nut is rotated into a clamping position wherein the notch nearest the groove in the bolt is not directly aligned with the groove, the pin may be deflected partially around the bolt and then bent outwardly transversely of the bolt between the outwardly flared sides of said nearest notch.

4. As a new article of manufacture, a lock nut designed for use with a bolt embodying a longitudinal groove in the outer end of the threaded shank thereof for a transversely bendable locking pin, and having an internally threaded, longitudinally extending hole for receiving the shank of the bolt and also having an annular series of radially extending, pin-receiving notches in the outer end thereof with flat bottom faces, said nut being adapted to be turned onto the outer end of the shank of the bolt into a clamping position and being centrally counterbored and chamfered in the notched part thereof to form a comparatively wide, flat annular surface flush with the flat bottoms of the notches and an outwardly flared, straight-sided, inner side surface which together define around the outer end of the hole an annular outwardly flared space whereby when the nut is rotated into a clamping position wherein the notch nearest the groove in the bolt is not directly aligned with the groove, the pin may be deflected partially around the bolt and then bent outwardly transversely of the bolt into said nearest notch.

5. As a new article of manufacture, a lock nut designed for use with a bolt embodying a longitudinal groove in the outer end of the threaded shank thereof for a transversely bendable locking pin, and having an internally threaded, longitudinally extending hole for receiving the shank of the bolt and also having an annular series of radially extending, pin-receiving notches in the outer end thereof with flat bottom faces, and sides flared outwardly longitudinally of the nut, said nut being adapted to be turned onto the outer end of the shank of the bolt into a clamping position and being centrally counterbored and chamfered in the notched part thereof to form a comparatively wide, flat, annular surface coplanar with the bottoms of the notches and an outwardly flared, straight-sided, inner side surface which together define around the outer end of the hole an annular, outwardly flared space whereby when the nut is rotated into a clamping position wherein the notch nearest the groove in the bolt is not directly aligned with the groove, the pin may be deflected partially around the bolt and then bent outwardly transversely of the bolt between the outwardly flared sides of said nearest notch.

6. In combination with a bolt having a threaded shank with a longitudinal groove in the outer end of the shank and having in the groove and extending longitudinally thereof a soft metal locking pin with an enlargement at the central portion thereof and its outer end projecting beyond the outer end of the shank, a nut on the shank of the bolt and adapted when turned into a clamping position to cross-cut with the teeth thereof the aforesaid enlargement on the pin for locking purposes and having in the outer end thereof comparatively wide radially extending, pin receiving grooves, each of which has sides which flare outwardly longitudinally of the pin in order to facilitate bending the projecting end of the pin into it when it is adjacent to, but not substantially aligned with, the groove.

7. In combination with a bolt having a threaded shank with a longitudinal groove in the outer end of the shank and having in the groove and extending longitudinally thereof a soft metal locking pin with an enlargement at the central portion thereof and its outer end projecting beyond the outer end of the shank, a nut mounted on the shank of the bolt and adapted when turned into a clamping position to cross-cut with the teeth thereof the aforesaid enlargement on the pin for locking purposes, said nut having in the outer end thereof an annular series of radially extending notches with flared sides and embodying an annular space in the notched part and around the outer end of the hole therein whereby when it is rotated into its clamping position and the notch nearest the groove in the shank of the bolt is not directly aligned with said groove the projecting end of the pin may be deflected partially around the bolt and then bent outwardly transversely of the bolt between the flared sides of said nearest notch in order further to lock the nut against rotation.

CHESTER C. HARBRIDGE.